United States Patent [19]

Brixner et al.

[11] Patent Number: 5,227,254

[45] Date of Patent: Jul. 13, 1993

[54] PHOTOSTIMULABLE EUROPIUM-DOPED BARIUM FLUOROBROMIDE PHOSPHORS

[75] Inventors: Lothar H. Brixner, West Chester, Pa.; August Ferretti, Wilmington, Del.

[73] Assignee: E. I. Du Pont de Nemours and Company, Wilmington, Del.

[21] Appl. No.: 717,453

[22] Filed: Jun. 19, 1991

[51] Int. Cl.$^5$ ................ C09K 11/61; B32B 5/16
[52] U.S. Cl. .................... 428/691; 428/690; 428/917; 250/483.1; 250/327.2; 250/487.1; 252/301.4 R; 252/301.4 H
[58] Field of Search .............. 428/917, 690, 691; 250/483.1, 327.2, 487.1; 252/301.4 R, 301.4 H

[56] References Cited

U.S. PATENT DOCUMENTS

| | | | |
|---|---|---|---|
| 3,859,527 | 1/1975 | Luckey | 250/327 |
| 4,100,101 | 7/1978 | Messier et al. | 252/301.4 |
| 4,239,968 | 12/1980 | Kotera et al. | 250/327.1 |
| 4,329,968 | 12/1980 | Kotera et al. | 250/327.1 |
| 4,336,154 | 6/1982 | Nishimura et al. | 252/301.4 |
| 4,400,619 | 8/1983 | Kotera et al. | 250/327.2 |
| 4,515,706 | 5/1985 | Takahara et al. | 252/301.4 |
| 4,535,237 | 8/1985 | Takahashi et al. | 250/327.2 |
| 4,608,190 | 8/1986 | Brixner | 252/301.4 |
| 4,689,278 | 8/1987 | Umemoto et al. | 428/690 |
| 4,876,161 | 10/1989 | Takahashi et al. | 428/691 |
| 5,077,144 | 12/1991 | Takahashi et al. | 428/691 |
| 5,077,145 | 12/1991 | Shinomiya et al. | 428/691 |

FOREIGN PATENT DOCUMENTS

083085  7/1983  European Pat. Off. .

OTHER PUBLICATIONS

Physical Review Letters, vol. 67, Dec. 16, 1991, Koschnick et al. pp. 3571-3574.
Seggern et al., S. Appl. Phys. 64(3), Aug. 1, 1988 pp. 1405-1412.
A. L. Stevels et al., Philiphs Research Reports, 30, 277 (1985).
A. L. Stevels et al, Philiphs Research Reports, 30, 277 (1975).

*Primary Examiner*—Ellis P. Robinson
*Assistant Examiner*—Charles R. Nold
*Attorney, Agent, or Firm*—R. Thomas Gallegos

[57] ABSTRACT

A europium-doped barium fluorohalide photostimulable phosphor comprises an amount of oxygen sufficient to create a concentration of anion vacancies effective to substantially increase the stored photostimulable energy, compared to a non-oxygen-treated phosphor.

3 Claims, No Drawings

PHOTOSTIMULABLE EUROPIUM-DOPED BARIUM FLUOROBROMIDE PHOSPHORS

FIELD OF THE INVENTION

This invention relates to anion-deficient, oxygen-containing, europium-doped barium fluorobromide photostimulable phosphors, to a process for the preparation of said photostimulable phosphors, and to image storage panels containing said photostimulable phosphors.

BACKGROUND OF THE INVENTION

Since the discovery of X-rays, permanent records of X-ray patterns have been made using a photographic emulsion. X-ray intensifying screens are generally used in conjunction with photographic film and serve to enhance the image formed on the film. Phosphors which are the active components of such screens convert X-radiation into photons which are more readily captured by a photographic emulsion to provide a permanent record. The phosphors should be good absorbers of X-rays of the energy used, (typically 30 to 100 KeV); they should emit light strongly in the region of the spectrum to which the film is sensitive and they should provide sharp, undistorted film images. Ideally, this light emission is all fluorescent or "prompt" emission with little or no delayed emission (sometimes called "afterglow", "phosphorescence" or "lag").

Another method of recording X-ray images is disclosed in U.S. Pat. No. 3,859,527. A temporary storage medium, for example a photostimulable phosphor panel is exposed to incident X-rays and, as a result, has temporarily stored therein an image in the form of trapped electrons and holes, the image being representative of the incident pattern. At some interval after exposure, a beam of infrared or visible light scans the panel to stimulate the release of the stored energy as light so that the emitted light can be detected and, for example, converted to an electrical signal which can then be processed to produce a visible image. For this purpose, the phosphor should store as much of the incident energy as possible until stimulated by the scanning beam. Ideally there would be no prompt emission or lag, and all emission would occur upon subsequent stimulation.

Europium-doped barium fluorohalides, BaFCl:Eu and BaFBr:Eu, have been used in conventional commercial X-ray intensifying screens. Because of its greater density and higher speed, BaFBr:Eu would be preferred for use as an intensifying screen phosphor over BaFCl:Eu, but historically BaFBr:Eu suffered from excessive "lag" relative to BaFCl:Eu. Areas of active research to improve BaFBr:Eu for use in X-ray intensifying screens have been the development of processes for preparing the phosphors or the identification of additives for the phosphors that improve the properties required to use in intensifying screens, that is the increase in prompt emission and the reduction of "afterglow" or "lag".

BaFBr:Eu is also the preferred phosphor for use in photostimulable storage panels (U.S. Pat. Nos. 4,239,968, 4,400,619, 4,535,237, vide infra). Research has been directed towards increasing the amount of incident energy stored and released upon subsequent photostimulation with the ultimate goal of minimizing the amount of radiation to which the subject is exposed.

U.S. Pat. No. 4,239,968 discloses a method for recording a radiation image using a photostimulable phosphor of the type disclosed in U.S. Pat. No. 4,336,154, infra, the phosphor being at least one selected from alkaline earth metal fluorohalides $(Ba_{1-x}M_x^{II})FX:yA$ wherein $M^{II}$ is at least one divalent metal selected from the group consisting of Mg, Ca, Sr, Zn and Cd, X is at least one of the halogens Cl, Br, and I, A is at least one element selected from the group consisting of Eu, Tb, Ce, Tm, Dy, Pr, Ho, Nd, Yb and Er, x and y are numbers satisfying the conditions $0 \leq y \leq 0.6$ and $0 \leq y \leq 0.2$ and the wavelength of the stimulation light is not less than 500 nm nor more than 1100 nm. No preparative method for the phosphor is disclosed.

U.S. Pat. No. 4,336,154 discloses a photostimulable boron-containing phosphor which provides "heretofore unattainable high luminance". The phosphor is of the formula $(Ba_{1-x}M_x^{II})F_2 \cdot aBaX_2:yEu,zB$, wherein $M^{II}$ and X are the same as in the aforesaid U.S. Pat. No. 4,239,968 except that $M^{II}$ can also be Be, and a, x, y and z satisfy the respective conditions $0.5 \leq a \leq 1.25$, $0 \leq x \leq 1$, $10^{-6} \leq y \leq 2 \times 10^{-1}$. Luminances exemplified are up to 1.85 times those of boron-free phosphors at stimulating light wavelengths of 450 to 800 nm. It also is disclosed that when an ammonium halide ($NH_4X$) is used as one of the raw materials for the phosphor, there may be times when the halogen (X) is present in excess of the stoichiometric amount in the mixture of raw materials. This excess halogen (X) is expelled from the reaction system in the form of $NH_4X$ during firing. The phosphors are prepared by heating a mixture of the raw materials (e.g., $BaF_2$, $M^{II}F_2$, $BaX_2$ or $NH_4X$, a europium compound and a boron compound) at 600° to 1000° C. for 1 to 6 hours. The heating may be carried out in air, but it is desirable to carry it out in a neutral atmosphere such as argon or nitrogen, or in a weakly reducing atmosphere such as one containing a small amount of hydrogen gas.

European Patent Application No. 0 083 085 discloses the preparation of a photostimulable phosphor represented by the formula $BaFX_xNaX':aEu^{2+}$ wherein X and X' each designate at least one of Cl, Br, and I, x is a number satisfying $0 < x \leq 10$, and "a" is a number satisfying $0 < a \leq 0.2$. The first of two firing steps is carried out in a weakly reducing atmosphere, such as nitrogen gas containing a small amount of hydrogen gas and the second of two firings is carried out in a neutral atmosphere such as nitrogen or argon gas.

U.S. Pat. No. 4,608,190 discloses phosphors that corresponding to the formula $Ba_{1-(a+b+c)}K_{(a+c)}Eu_bF_{1-a}X_{1-c}f_{(a+c)}$ where X=at least one of Cl and Br, f=anion deficiencies, a=0 to about 0.05, c=0 to about 0.05, a+c=0.0005 to about 0.05, and b=about 0.001 to about 0.02. The anion deficiencies are generated by heating a europium-doped barium fluorohalide, which is prepared by any commonly used method for utility in a conventional X-ray intensifying screen, in a hydrogen-containing inert gas atmosphere to remove some of the fluorine, chlorine and/or bromine.

U.S. Pat. No. 4,100,101 discloses phosphors that correspond to the formula $Ba_{1-x}Sr_xFH:yEu$ wherein x is from about 0 to about 0.5, y is from about 0.001 to about 0.100 and H is a halogen selected from chlorine and bromine wherein the Eu is a mixture of $Eu^{+2}$ and $Eu^{+3}$, the $Eu^{+3}$ being present in at least an effective and detectable amount. Phosphors of this invention are prepared in a non-reducing atmosphere. Cited utility of the phosphors is in X-ray intensifying screens. There is no disclosure nor suggestion that the phosphors disclosed in this patent contain oxygen. There is no disclosure nor suggestion that the phosphors disclosed in this patent contain anion deficiencies. There is no disclosure nor suggestion that the process disclosed in this patent can be used to prepare oxygen-containing phosphors or anion vacancy-containing phosphors. There is no disclosure nor suggestion that the phosphors disclosed in this patent would possess utility in photostimulable image storage panels.

A. L. N. Stevels et al., Philips Research Reports, 30, 277 (1975) in a discussion of the preparation of BaFCl:Eu and BaFBr:Eu phosphors for use in X-ray intensifying screens state that "even small traces of oxygen in the starting materials or in the gas flow during heating were fatal for both the light output and the afterglow of the sample." No indication of any beneficial effect of oxygen in the gas flow was disclosed nor was any suggested.

In U.S. Pat. No. 4,515,706, there are disclosed rare earth oxyfluoride barium fluoride halide phosphors of the formula aREOF.$(1-a)Ba_{(1-x)}M_xFX:Eu_y$, where RE is one element selected from the group consisting of Lu and Y, M is at least one element selected from the group consisting of Be, Mg, Ca, Sr, Zn and Cd, X is at least one element selected from the group consisting of Cl, Br, and I, a is greater than zero but less than or equal to 0.6, x is in the range from 0 to 0.5, inclusive, y is in the range from $10^{-6}$ to $2 \times 10^{-1}$, inclusive, and a is an amount such that the phosphor exhibits a higher luminous intensity than said phosphor without REOF when stimulated by light having a wavelength of 550 nm after being exposed to X-ray radiation. It is stated that "calcination may be carried out in air, but preferably the atmosphere is a reducing atmosphere such as N$_2$ (sic) or a mixture of N$_2$ and H$_2$." There is no disclosure nor suggestion that europium-doped barium fluorobromide phosphors might benefit from being fired in air.

All of the above references that refer to europium-doped barium fluorobromide phosphors invariably teach the use of hydrogen or hydrogen-containing atmospheres during firing to achieve reasonable photostimulability. It is therefore surprising and unexpected that use of an atmosphere comprising 1–2% oxygen in nitrogen during firing would yield a useful, photostimulable phosphor with superior performance characteristics. In this phosphor composition, it is believed that the oxygen provides a site for hole trapping and the vacancy will trap the electrons from electron hole pair generation upon X-ray stimulation.

SUMMARY OF THE INVENTION

The purpose of this invention is to provide oxygen-containing photostimulable phosphors for use in image storage panels. These oxygen-containing photostimulable phosphors are of the formula $Ba_{1-x}Eu_xFBr_{1-2y}O_y\phi_y$ wherein:

$\phi$ symbolizes an anion vacancy, x has a value from about 0.001 to about 0.05, and y has a value from about 0.0001 to about 0.01.

Another purpose of this invention is to provide a process to prepare these oxygen-containing photostimulable phosphors containing particles of a preselected diameter that are suitable for use in image storage panels without resorting to extensive grinding which is injurious to the surfaces of the particles, which process comprises the steps of:

(a) preparing a slurry containing BaF$_2$, BaBr$_2$ and a europium halide, wherein the amount of BaBr$_2$ is at least equal to that required stoichiometrically to form BaFBr;

(b) agitating said slurry for a time sufficient to permit substantially all of said BaF$_2$ to react with said BaBr$_2$ to form BaFBr;

(c) spray drying the resulting slurry of step (b) under conditions that produce porous spheroidal agglomerates having an average diameter larger than that of the preselected diameter;

(d) firing said spheroidal agglomerates in an inert atmosphere for from about 10 to about 120 minutes at a temperature of from about 650° C. to about 800° C.;

(e) cooling the fired material of step (d) to ambient temperature in an inert atmosphere;

(f) washing the cooled material of step (e) with a solvent capable of selectively dissolving any excess BaBr$_2$;

(g) drying the washed material of step (f) to produce a free-flowing powder of the BaFBr:Eu phosphor;

(h) heat treating the phosphor of step (g) at a temperature of from about 850° C. to about 950° C. for from about ½ to about 15 hours in an atmosphere of nitrogen containing about 1 to 2% oxygen to yield oxygen-containing photostimulable phosphors of the formula $Ba_{1-x}Eu_xFBr_{1-2y}O_y\phi_y$.

Still another purpose is to provide image storage panels containing the above phosphors.

DETAILED DESCRIPTION OF THE INVENTION

The invention provides oxygen-containing photostimulable phosphors for use in image storage panels. These oxygen-containing photostimulable phosphors are of the formula $Ba_{1-x}Eu_xFBr_{1-2y}O_y\phi_y$ wherein:

$\phi$ symbolizes an anion vacancy, x has a value from about 0.001 to about 0.05, preferably about 0.0025, and y has a value from about 0.0001 to about 0.01, preferably about 0.001 to 0.01, more preferably 0.0005.

The invention also provides a process to prepare these oxygen-containing photostimulable phosphors containing particles of a preselected diameter that are suitable for use in image storage panels, which process comprises the steps of:

(a) preparing a slurry containing BaF$_2$, BaBr$_2$ and a europium halide (e.g., a fluoride, bromide, chloride or iodide), wherein the amount of BaBr$_2$ is at least equal to that required stoichiometrically to form BaFBr;

(b) agitating said slurry for a time sufficient to permit essentially all of said BaF$_2$ to react with said BaBr$_2$ to form BaFBr;

(c) spray drying the resulting slurry of step b) under conditions that produce porous spheroidal agglomerates having an average diameter larger than that of the preselected diameter;

(d) firing said spheroidal agglomerates in an inert atmosphere for from about 10 to about 120 minutes at a temperature of from about 650° C. to about 800° C.;

(e) cooling the fired material of step (d) to ambient temperature in an inert atmosphere;

(f) washing the cooled material of step (e) with a solvent capable of selectively dissolving any excess BaBr$_2$;

(g) drying the washed material of step (f) to produce a free flowing powder of the BaFBr:Eu phosphor;

(h) heat treating the phosphor of step (g) at a temperature of from about 850° C. to about 950° C. for from about ½ to about 15 hours in an atmosphere of nitrogen containing about 1 to 2% oxygen to yield oxygen-containing photostimulable phosphors of the formula $Ba_{1-x}Eu_xFBr_{1-2y}O_y\phi_y$.

The invention also provides image storage panels containing the above phosphors.

The anion-deficient, oxygen-containing, europium-doped barium fluorobromide phosphor of this invention, upon absorption of X-rays and subsequent stimulation with light, provides significantly greater amounts of stimulated emission than photostimulable phosphors previously reported including other europium-doped barium fluorobromide phosphors. As a result, X-ray image storage panels of this invention with the phosphor consisting essentially of this anion-deficient, oxygen-containing europium-doped barium fluorobromide are significantly more sensitive than panels using other phosphors, and the stored photostimulable energy of the phosphor is substantially increased over non-oxygen-treated phosphors. Specifically, the stored energy is increased over non-oxygen-treated phosphor by an amount of 5, 10, 15, or 20%.

The first step of the process comprises forming in a liquid phase a slurry consisting of BaFBr, $BaBr_2$ and europium halides, such as $EuF_2$, $EuF_3$, $EuCl_3$, or mixtures thereof.

Organic liquids or water or mixtures thereof can be used as the liquid phase. For example, a slurry of $BaF_2$, $BaBr_2$, and an europium halide such as $EuF_2$ can be formed in an organic liquid such as methanol. When an organic liquid is used, it is necessary to treat the spray dried material to insure the removal of substantially all organic material before firing in an inert atmosphere. Phosphors made with the use of organic liquids are therefore first fired in air at about 250° C. to about 375° C. for about 0.5 to 1.5 hours before firing in the inert atmosphere.

The preferred method of forming the slurry is to precipitate BaFBr in a vigorously stirred aqueous $BaBr_2$ solution containing europium halide. This is accomplished by a digestion-precipitation process involving $BaF_2$ and an aqueous $BaBr_2$ solution according to the following equation:

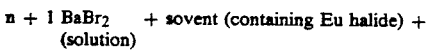

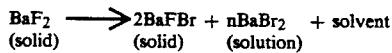

The amount of $BaBr_2$ employed is from about 1.0 to about 5 times that required by stoichiometry. That is, n in the above equation is from about 0 to about 4. $BaF_2$ powder is slowly added to the aqueous $BaBr_2$ solution which contains the europium halide over a period of about 5 to 15 minutes. The amount of $BaBr_2$ must be at least about equivalent to the stoichiometric amount, as indicated earlier.

Use of at least equivalent amounts of $BaBr_2$ is important for two reasons. When less than an equivalent amount of $BaBr_2$ is used, the BaFBr product may contain some unconverted $BaF_2$. Excess $BaF_2$ in the formulation is detrimental to final phosphor properties in that the phosphor exhibits lower prompt emission and higher delayed emission (lag). The detrimental effects of $BaF_2$ are evident regardless of what process is employed to make BaFBr:Eu.

In order to ensure the presence of a satisfactory amount of flux in the subsequent firing step, it is desirable to use an amount of $BaBr_2$ that is at least about 40% in excess of that required by stoichiometry. It is preferred to use an amount of $BaBr_2$ such that the aqueous solution is at all times at least 50% saturated with $BaBr_2$.

Excess $BaBr_2$ is desirable to serve as a flux. The particular flux and the quantity of the flux is important. For example, it is believed that the spray drying, while effecting water removal, causes the BaFBr and europium halide to be coated and cemented together with solid $BaBr_2$ to form porous spheroidal agglomerates. In addition, during the firing, the $BaBr_2$ flux enhances the sintering of the particles in the agglomerate and the diffusion of the europium into the BaFBr lattice. Finally, the flux must be immiscible in BaFBr:Eu at room temperature, and it must be rejected to the surface of the BaFBr:Eu phosphor particle where it can be removed by dissolving without affecting the BaFBr:Eu. $BaBr_2$ is the flux material which best satisfies all of the above requirements. Up to about a five fold excess of $BaBr_2$ over that required by stoichiometry has been used successfully, but it is not believed that this is the upper limit, although no benefit is expected from exceeding this value.

After the $BaF_2$ is added, vigorous stirring is maintained for about 4 to about 24 hours, depending on the sample size. The time is not critical, but is generally that required to effect the essentially complete reaction of $BaF_2$ and $BaBr_2$ to form BaFBr. When the BaFBr precipitation step is completed, a small portion of the slurry can be removed, filtered, washed with a solvent selected for its ability to remove excess $BaBr_2$ (see below) and dried prior to subjecting it to X-ray analysis to confirm that the reaction is essentially completed, e.g., by determining that there is no evidence of remaining $BaF_2$ X-ray diffraction lines The preferred europium sources are water soluble $EuCl_3$ or $EuBr_3$. While these europium sources are more oxidation susceptible than the corresponding fluorides, they tend to ensure a more uniform distribution of the europium throughout the BaFBr matrix. The amount of europium halide used depends on the amount of Eu-doping desired in the phosphor. Generally, the art discloses that $Ba_{1-y}Eu_yFBr$, wherein y is from about 0.001 to about 0.2 is preferred for use as phosphor in X-ray intensifying screens. One of ordinary skill may produce a phosphor containing a given amount of europium with only routine experimentation to determine the amount retained in the phosphor and the amount washed out in the flux.

The slurry comprised of BaFBr and the europium halide in a $BaBr_2$-containing solution is spray dried using conditions which produce spray dried particles with diameters larger than the desired diameter of the BaFBr phosphor particles. The porous spheroidal agglomerates which are produced contain BaFBr, $BaBr_2$, and europium halide. The specific operating conditions to produce spray dried agglomerates of a certain size will depend in part on the particular spray drying apparatus, but appropriate variations of spray drying conditions to gain desired results are well known to those familiar with spray drying. Of interest is that spray drying in accordance with the instant invention does lead to useful phosphors, despite the teaching of U.S. Pat. No. 4,532,071, which states that BaFBr is not formed by spray drying a suspension of $BaF_2$ and $BaBr_2$.

The porous spheroidal agglomerates obtained by spray drying must be fired at such a temperature and for such a time so as to produce the desired particulate product. The size of the phosphor particles is determined by the agglomerate size and firing conditions. If the temperature is too low, or the firing time too short, consolidation of the diffusion will be insufficient. Excessive firing temperatures or times cause excessive grain growth of large BaFBr platelets. The firing temperature is preferably in the range of about 650° C. to about 800° C., and the firing time is preferably in the range of about 10 to about 120 minutes to obtain the desired product. Preferably, the firing temperature is from about 700° C. to about 800° C., and the firing time is from about 10 to 50 minutes. The firing is carried out, and the resulting product is cooled in a flowing atmosphere comprised of an inert gas such as argon or nitrogen. Although any type of furnace which is capable of producing the desired heating conditions with the required atmosphere can be used to carry out the firing, a belt furnace is preferred. The use of a belt furnace permits the firing of a large number of samples in a continuous manner. Sample containers made of nonreactive materials such as fused silica or recrystallized alumina can be used.

The particulate product of the process of the present invention is obtained without resorting to extensive grinding which is deleterious to light output because it causes damage to the surface of the particles. In U.S. Pat. No. 4,157,891, grinding is resorted to in the preparation of a BaFBr:Eu phosphor according to a different process. In this case, the employing of a grinding step necessitates the introduction of an additional process step, a second firing step, to heal the damage incurred in the grinding step. Moreover, grinding results in an unavoidable yield loss in that some too-fine particles, "fines," are always generated in a grinding step. These fines, in the case of image storage panels, are not useable in the final panel product. Thus, these fines represent a yield loss.

The fired material is washed with a selective solvent to remove excess $BaBr_2$ and any other soluble material which may be present. The term "selective solvent" as used herein denotes a solvent capable of dissolving the $BaBr_2$ without affecting the BaFBr:Eu. Suitable solvents include, but are not limited to, methanol and a mixture of water and citric acid, preferably about 90:10 by volume, respectively. Solvation can be accomplished by soaking or stirring of the sintered material in amounts of selective solvent which are in excess of that necessary to dissolve the soluble material present. The $BaBr_2$ and solvent may be reclaimed and used in subsequent phosphor preparations. If an aqueous citric acid wash is employed, the washed phosphor may be further washed with an organic solvent, e.g., isopropanol or acetone, in order to facilitate drying. After removal of the flux by dissolving, the remaining insoluble material is dried and a free-flowing powder product consisting of particles of europium-doped barium fluoride is obtained. The particles have a narrow size distribution.

In the next step of the process, the above "conventional" X-ray phosphor is charged into an inert container, for example a silica boat, and heat treated at a temperature of from about 850° C. to about 950° for from about one-half to about 15 hours in an atmosphere of nitrogen containing about 1-2% oxygen. The resultant phosphor is the oxygen containing, anion deficient phosphor of this invention for which the stimulated emission is increased by a factor of 2 to 8 over the conventional phosphor without the oxygen treatment.

The difficulties encountered in producing photostimulable phosphors can be understood by considering the proposed image storage mechanism. X-ray absorption by the phosphor results in the generation of electron-hole pairs, the number of such pairs being proportional to the energy absorbed. The holes in the compositions of the present invention are trapped by $O^{2-}$. The electrons are trapped by vacancies. Electrons undergo recombination with the hole in a radiative transition at the europium (II) site and luminescence occurs. Some electrons may return to the ground state; i.e., recombine with a hole by phonon-assisted radiationless transitions. Trapping slows down electron-hole luminescent recombination at the europium activator. Shallow traps have low activation energies and therefore electrons can be thermally activated into the conduction band even at ambient temperatures and the mobile electrons can then undergo the luminescent transition at the activator. Deep traps have high activation energies and therefore very few electrons are thermally activated into the conduction band. These electrons can be activated by the absorption of photons when the phosphor is stimulated.

A phosphor used in conventional X-ray intensifying screens in conjunction with photographic film should have as few traps as possible so that the luminescent transition is not delayed but rather that all emission be prompt (i.e., fluorescence). A phosphor used in photostimulable X-ray image storage panels should have deep traps that can retain the electrons until stimulated by a beam of light. In both conventional X-ray intensifying screens and photostimulable X-ray image storage panels shallow traps are to be avoided since thermal stimulation with the resultant continuous decaying luminescence (lag) reduces the prompt emission and causes degradation of the image or results in multiple images on the film in the former use and, in competing with deep traps for electrons and providing a way for the electrons to prematurely recombine, reduces the stimulated emission in the latter use.

The anion-deficient, oxygen-containing phosphor of the present invention has been found to have the necessary properties to make excellent photostimulable phosphors. It is believed that anion deficiencies provide the necessary trapping of electrons and that $O^{2-}$ acts as a trap for the holes. Especially preferred as a stimulating light is the 633 nm emission from a Helium-Neon laser.

The invention also provides X-ray storage panels containing the phosphors defined above. In a typical X-ray storage panel intensifying screen the powdered phosphor composition, as a thin layer, is adhered to a flexible support, such as cardboard or a polyester film, by means of a polymeric binder. The phosphor-binder composite can contain about 85% to about 96% phosphor, by weight. The phosphor layer is typically coated onto the support at a wet thickness of about 0.005 inch (0.0127 cm) to about 0.050 inch (0.127 cm). The phosphor layer composition can be prepared, using common dispersion techniques, in any conventional binder. This is usually accomplished by ball-milling the phosphor, binder, solvent, and other adjuvants for an appropriate period of time. The procedures and useful binding agents are fully described in the prior art, for example, U.S. Pat. Nos. 2,648,013; 2,819,183; 2,907,882; 3,043,710; and 3,895,157.

Optionally, it is frequently desirable to overcoat the phosphor layer with a thin, transparent protective layer, to permit cleaning. Useful protective layers are also described in the prior art, e.g., in the above listed U.S. patents. It is also sometimes desirable to first coat the flexible support (that is, beneath the phosphor) with a light-reflective layer, such as a white pigment, to further intensify the light output of the screen. Conventional supports which can be used include cardboard, suitably sized or coated, for example with baryte, cellulose acetate propionate, cellulose acetate, cellulose propionate, cellulose acetate butyrate, poly(vinyl chloride or vinyl acetate), polyamide, metal sheeting, for example, aluminum, and poly(ethylene terephthalate), the latter being a preferred support. The support may have, for example, a thickness of about 0.00025 inch (0.00064 cm) to about 0.30 inch (0.76 cm), with films having a thickness up to about 0.02 inch (0.05 cm) being preferred.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

All fired samples prepared in the examples were fired in fused silica boats in a belt furnace (B.T.U. Inc. Mode. TLH-22-32-4N12Y, North Billerica, Mass.) having three heating zones with an effective heating length of 24 inches (60 cm). The nitrogen flow, or 2% oxygen-containing nitrogen flow, through the furnace during the firing steps was maintained at between 20 liter/minute and 25 liter/minute.

To minimize possible contamination with silica, all of the apparatus used to prepare and mix the BaFBr slurries was made of, or coated with, Teflon ® fluoropolymer.

In the foregoing and in the following examples, all temperatures are set forth uncorrected in degrees Celsius and unless otherwise indicated, all parts and percentages are by weight.

The entire disclosures of all applications, patents and publications, cited above and below, are hereby incorporated by reference.

EXAMPLES

Sample Preparation

A phosphor of the invention is sieved through a 400 mesh sieve (U.S. Sieve Series) and the following components are introduced into a 15 cc-vial containing eight 4 mm diameter glass beads (see U.S. Pat. No. 3,043,710):

4.58 g of phosphor
1.00 ml of butyl acetate
2.54 g of polyvinyl butyral binder.

The resultant mixture is shaken on a Spex ® oscillatory-type shaker for 15 minutes, then immediately coated on a pigment board using a Goodner mechanical coater and a 30 mil (254 μm) draw-down knife. The resultant coating is dried in air for at least 15 minutes to give a dry coating of ~150 to 200 μm thickness. A 1 inch×1½ inch (2.54×3.81 cm) sample is cut from the coated board and mounted on a pigment board with other samples and standards for exposure tests.

Sample Testing

Prompt emission is measured as follows. The pigment board with the screen samples attached is inserted into an 8 inch by 10 inch (20.3×25.4 cm) cassette containing a sheet of high speed medical X-ray film, in this instance DU PONT CRONEX ®-4 film. An X-ray exposure of 1.0 mAs (at 80 kVp) is made at a distance of 25 inches (63.5 cm) from a tungsten source filtered by ¼ inch (6.35 mm) thick aluminum. The film is then removed and processed in an automatic rapid processor which is operated at 33° C. and contains the standard p-N-methylamine hydrosulfate/hydroquinone developer, with a total processing time of 90 seconds (to develop, fix, wash and dry). The optical density of the exposed and developed film is determined using a MacBeth digital densitometer, recorded as the "speed" and quoted relative to the density of an identical exposure made using a commercial DUPONT CRONEX ® HI PLUS intensifying screen made with calcium tungstate phosphor.

Photostimulable emission is measured as described in U.S. Pat. No. 4,608,190.

EXAMPLE 1

Preparation of "Conventional" $Ba_{0.9975}Eu_{0.0025}FBr$

Barium bromide dihydrate (894 g, 2.68 mole) is dissolved in 1050 ml of distilled water, and the solution is filtered to remove insoluble impurities. To this solution is added, with stirring, europium (III) bromide (1.73 g, 0.00443 mole dissolved in 31.2 ml of water) and barium fluoride (154.89 g, 0.883 mole). the slurry is agitated overnight, and then spray dried in a Niro ® (Niro Atomizer, Columbia, Md. 21045) spray drier with a 31.5 inch diameter spray chamber and a rotary atomizer (Model number M-02/B). Spray drying conditions include an inlet temperature of 225° C. and an outlet temperature of 130° C. The resulting agglomerated powder is then fired in a BTU belt furnace under flowing nitrogen at 25 liter/minute at 770° C. in silica boats. The belt speed is ¼" per minute through a total hot zone length of 24 inches. After firing, the product is slurried with methanol to remove excess barium bromide. The methanol extract is separated from the product using a sintered glass filter funnel. After air drying, the product is a free-flowing powder that does not require any milling or grinding for screen preparation. An 8" by 10" test screen is prepared with this conventional phosphor and the following results are obtained:

Speed, 1.5 (relative to commercial DUPONT CRONEX ® HI PLUS)
Lag, 0.91
PSL speed (A), 0.54

EXAMPLE 2

Conversion of "Conventional" Phosphor of Example 1 to the Phosphor of the Current Invention The phosphor of experiment 1 (50 g) is charged into a quartz boat and put into the previously described belt furnace. The temperature is held at 900° C. and the belt speed is ¼ inch per minute through the 24" heated zone. The gas atmosphere consists of premixed nitrogen—1 to 2% oxygen. During this treatment, the phosphor agglomerates slightly and some degree of mild grinding is necessary to pass all phosphor through a 200 mesh screen. The PSL speed (A) in a test screen is 3.71. This constitutes a 6.9 fold improvement over the conventional phosphor of Example 1.

The formula which best describes the composition of Example 1 is:

$$Ba_{0.9975}Eu_{0.0025}FBr_{0.999}O_{0.0005}\phi_{0.0005}.$$

Such a composition requires 34 ppm oxygen. In analytical experiments similar to those described by B-L. Hu et al., J. Mater. Res., Vol. 4, No. 4, Jul./Aug. 1989, values of 31 and 40 ppm oxygen are obtained.

EXAMPLE 3

Conversion of Conventional Phosphor of Example 2 to a PSL Phosphor Using a Sintering Aid (Alumina) to Eliminate Need for Post Oxygen Treatment Grinding (General Method of Using Sintering Aid Reported in J. M. Thomas, Introduction to the Principles of Heterogeneous Catalysis, Academic Press, N.Y., 1967, p. 409, line 35)

The phosphor of experiment 1 (50 g) was combined with 0.85 g of SUMITOME AKP-50 α-alumina and mixed prior to firing under the conditions in Example 1. The product phosphor was completely free flowing and 99.3% passed a 200 mesh screen. The fact that such a product is essentially free of surface strains which can quench luminescence is demonstrated by the superior PSL speed. PSL speed (A), 4.20.

EXAMPLE 4 (Comparative)

In U.S. Pat. No. 4,515,706 (Rare Earth Oxyfluoride Barium Fluoride Halide Phosphor), it is stated that "Calcination may be carried out in air, but preferably the atmosphere is a reducing atmosphere such as $N_2$ or a mixture of $N_2$ and $H_2$." The phosphor of Example 1 (50 g) is combined with 0.85 g of SUMITOME AKP-50 α-alumina and is mixed on a paint shaker for 30 minutes. This mixture is then placed in a silica boat and is fired in the BTU belt furnace under the conditions described in Example 2 except that the furnace is modified by removing the end baffle plates to allow the free circulation of air, and no gas sweep is introduced. After cooling to room temperature, the resulting free flowing phosphor product is used to prepare a test screen. The PSL speed (A) is found to be 0.012. Comparison of this value to the value achieved in Example 2 (A=3.71) demonstrates that firing in air does not yield the product of the process of the present invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A europium-doped barium fluorohalide photostimulable phosphor of the formula $$Ba_{1-x}Eu_xFBr_{1-2y}O_y\phi_y,$$

wherein $\phi$ represents an anion vacancy, x is about 0.001 to about 0.05, and y is about 0.0001 to about 0.01;

the amount of oxygen being sufficient to create a concentration of anion vacancies effective to substantially increase the stored photostimulable energy, compared to a non-oxygen-treated phosphor.

2. A phosphor of claim 1, wherein y is about 0.001 to about 0.01.

3. In an X-ray image storage panel comprising a substrate and a layer of a photostimulable phosphor, the improvement wherein the phosphor is one of claim 1.

* * * * *